(12) United States Patent
Hashimukai

(10) Patent No.: US 6,401,011 B1
(45) Date of Patent: Jun. 4, 2002

(54) SYNCHRONOUS CONTROL DEVICE FOR ROBOTS

(75) Inventor: Yoshiharu Hashimukai, Ishikawa-ken (JP)

(73) Assignee: Aida Engineering Co., Ltd. (JP)

( * ) Notice: Subject to any disclaimer, the term of this patent is extended or adjusted under 35 U.S.C. 154(b) by 0 days.

(21) Appl. No.: 09/723,695

(22) Filed: Nov. 28, 2000

(30) Foreign Application Priority Data

Feb. 2, 2000 (JP) ........................................ 2000-025392

(51) Int. Cl.⁷ .......................................... G05B 19/418
(52) U.S. Cl. ........................... 700/248; 700/56; 700/83; 700/86; 700/245; 700/292; 29/430; 29/783; 29/787; 901/6; 901/8; 318/587; 414/277
(58) Field of Search ................................ 700/245, 248, 700/11, 17, 56, 83, 86, 292; 901/6, 8; 701/24, 25; 29/711, 783, 701, 784, 787, 240, 430; 318/587; 414/277, 281, 416.01

(56) References Cited

U.S. PATENT DOCUMENTS

| | | | | |
|---|---|---|---|---|
| 4,815,190 A | * | 3/1989 | Haba, Jr. et al. | 29/430 |
| 4,894,908 A | * | 1/1990 | Haba, Jr. et al. | 29/711 |
| 5,084,826 A | * | 1/1992 | Hariki et al. | 700/248 |
| 5,995,884 A | * | 11/1999 | Allen et al. | 701/24 |

OTHER PUBLICATIONS

Fok et al., A flexible multiple mobile robots system, 1992, IEEE, pp. 607–623.*

Suh et al., Design and implementation of a dual-arm robot control system with multi-sensor intergrating capability, 1991, IEEE, pp. 898–903.*

* cited by examiner

*Primary Examiner*—Jacques H. Louis-Jacques
*Assistant Examiner*—McDieunel Marc
(74) *Attorney, Agent, or Firm*—Morrison Law Firm

(57) ABSTRACT

A synchronous control unit receives data describing robot motion and speed along a pathway. A storage unit stores the data. In accordance with an internal clock or encoder equivalent internal to the robot, an output unit outputs the data to a positioning controller thereby synchronizing the robot movement with the data.

8 Claims, 6 Drawing Sheets

Fig. 6 PRIOR ART
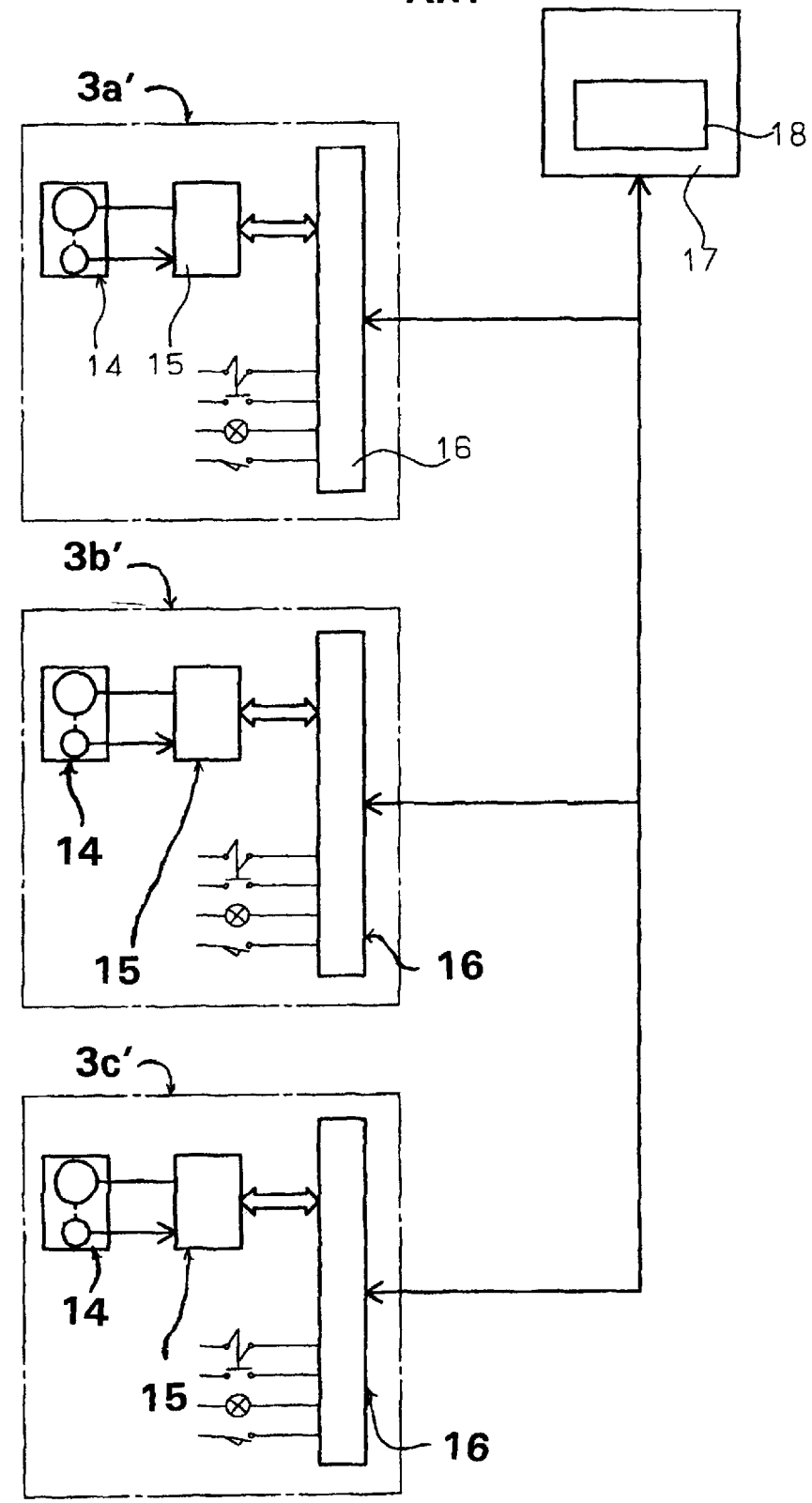

SYNCHRONOUS CONTROL DEVICE FOR ROBOTS

BACKGROUND TO THE INVENTION

1. Field of the Invention

The present invention relates to a work-transporting robot provided between a plurality of press machines; particularly, the present invention relates to a synchronous control device for a plurality of robots.

2. Description of the Related Art

Conventionally known are press systems where pressing by a plurality of press machines occurs by transporting a work item in sequence using a work transport line. The work transport line involves a plurality of robots, a material supply device at an upstream side, a product removal device at a downstream side, and a plurality of intermediate stages.

Each robot transports a work item in a sequential manner between the intermediate stages. Each robot, the material supply device, and the product removal device are conventionally operated in an electronically linked manner, as will be described. During operation, each of the robots travels to a work retrieve position, from a home position, retrieves the work item, advances to a work release position, releases the work item, and returns to the home position.

During conventional operation, the position of the robots is matched at both a midpoint in the advance motion and the return motion. The midpoints are also linked to the motion of the material supply device and the product removal device, as will be explained. When each of the robots reaches the return midpoint, the corresponding press machines are activated and pressing is conducted.

During the advance and the return motion, a transporting speed for each of the robots may differ as a result in several factors. These factors include, differences in the weight of each work item, differences in the advance and return motions, and differences in retrieve and release motions. Thus, during adjustment to the press machines, robots, work transport line, or product removal device, each of the robots must be operated alone in order to avoid interference with adjacent robots or other devices.

Referring now to FIG. 6, a conventional flow control diagram for the work transport line includes a master board 17 linking a programmable controller 18 to three robots 3a', 3b', and 3c'. Additional conventional links to the material supply device (not shown) and the material removal device (not shown) are omitted for clarity.

Each robot 3a', 3b', and 3c' includes a programmable controller 16, a servo amp 15 and a servo motor 14 each in electronic communication with the other. Each robot 3a', 3b', and 3c' is linked to and controlled by programmable controller 18, through corresponding programmable controller 16. Electronic communications pass from programmable controller 16, by corresponding servo amp 15, to servo motor 14. Each servo motor 14 acts as a drive source for each corresponding robot 3a', 3b', and 3c' through a mechanical construction member (not shown).

During conventional linked operation, programmable controller 18 signals each robot 3a', 3b', and 3c', through corresponding programmable controllers 16, to go to the corresponding work retrieve positions, retrieve the work items, and advance to the advance midpoints and wait. Once programmable controllers 18, 16 confirm that all robots 3a', 3b', and 3c' have reached the advance midpoints, each robot 3a', 3b', and 3c' advances to the corresponding work release position and releases the work items.

After releasing the work items, robots 3a', 3b', and 3c' return to the corresponding return midpoints and wait. Once programmable controllers 18, 16 confirm that all robots 3a', 3b', and 3c' have reached the corresponding return midpoints, all robots 3a', 3b', and 3c' wait for further signals from programmable controller 18. The return midpoint is also a home position for robots 3a', 3b', and 3c'. When robots 3a', 3b', and 3c' have reached the corresponding return midpoints, the corresponding press machines are activated. Repetition of the above described conventional process advances corresponding work items through the press system (not shown).

Using the conventional process, only the midpoint in the advance and the midpoint in the return are matched for corresponding robot 3a', 3b', and 3c'. As a result, the general movements of robots 3a', 3b', and 3c' are not continuously synchronized.

During adjustment, exchange of dies, or other maintenance activity conducted on the press system (not shown), robots 3a', 3b', and 3c' are operated individually in an inching operation (not shown). Since adjacent robots 3a', 3b', and 3c' are not synchronized, the inching operation is conducted by individual inching movements (not shown). In this case, to avoid interference between adjacent robots 3a', 3b', and 3c', the range of inching movement is limited. As a result, adjustment, exchange of dies, or other maintenance activity is complex and time consuming thereby increasing operating costs.

OBJECT AND SUMMARY OF THE INVENTION

It is an object of the present invention to provide a synchronous control device for a robot.

It is another object of the present invention to provide a synchronous control device to synchronize the operation of multiple work-transporting robots without matching the position of the robots at a point.

It is another object of the present invention to provide a synchronous control device adaptable to synchronize an inching or linked operation of multiple robots.

It is another object of the present invention to provide a synchronous control device for multiple robots that minimizes the danger of interference between adjacent robots during inching or linked operation.

A synchronous control device receives expansion data describing robot movement, stores the expansion data in a storage element, and in accordance with an internal clock or encoder equivalent, outputs the expansion data to a positioning controller through an output element to continuously control robot movement.

According to an embodiment of the present invention there is provided a synchronous control device comprising: an internal clock being of a type equivalent to a speed of an outside element, means for storing data characterizing a path and the speed of the outside element, means for outputting the data to a positioning controller in accordance with the internal clock, and the positioning controller receiving the data and controlling the outside element, whereby the outside element is continuously synchronized with the data.

According to another embodiment of the present invention there is provided a synchronous control device, comprising: means for storing data characterizing a path of a robot, a clock being of a type equivalent to a speed of said robot, means for outputting the data to a positioning controller in accordance with the clock, and the positioning controller commanding a control source for the robot, whereby the robot is continuously synchronized with the data.

According to another embodiment of the present invention there is provided a synchronous control device wherein: the clock is replaced with an encoder signal detecting a crank position of the robot.

According to another embodiment of the present invention there is provided a synchronous control device for a robot, being a synchronous control device for a work-transporting robot provided between press machines and having a drive source, comprising: an internal clock being of a type equivalent to a motion speed of the robot, a positioning controller being of a type which outputs a command signal to a drive source for the robot, means for storage being of a type which stores data describing a path of the robot, and means for output being of a type which outputs the data to the positioning controller in accordance with the internal clock.

According to another embodiment of the present invention there is provided a synchronous control device, wherein: the internal clock is replaced with a signal of an encoder detecting a crank angle of a press machine.

According to another embodiment of the present invention there is provided a synchronous control device, wherein: the motion speed of the robot is a work transport speed.

According to another embodiment of the present invention there is provided a synchronous control device, wherein: the drive source of the robot is a servo amp controlling a servo motor.

The above, and other objects, features and advantages of the present invention will become apparent from the following description read in conjunction with the accompanying drawings, in which like reference numerals designate the same elements.

BRIEF DESCRIPTION OF THE FIGURES

FIG. 6 is a control flow diagram for a plurality of conventional robots.

DESCRIPTION OF THE PREFERRED EMBODIMENTS

Figure 1:
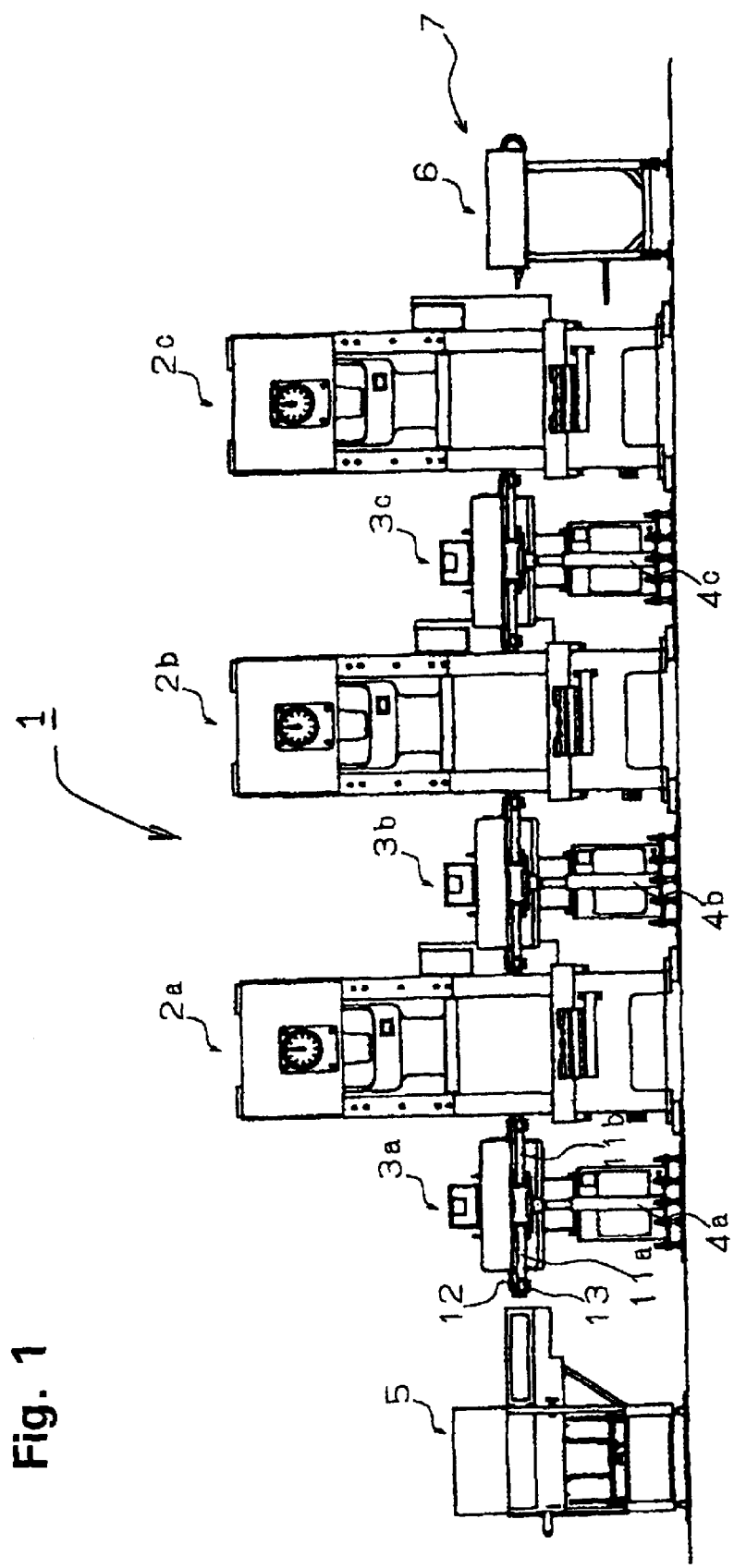
FIG. 1 is a front view of a press system according to an embodiment of the present invention.

Referring now to FIG. 1, a first embodiment of a press system 1 includes three press machines 2a, 2b, and 2c for conducting pressing work on a work item (not shown), and a work transport line 7, for transporting the work item through press system 1 from an upstream side (to the left facing the page) to a downstream side.

A material supply device 5, positioned on the upstream side of press system 1, provides the work items (not shown) for pressing. A product removal device 6, positioned on the downstream side of press system 1, removes the pressed work item after pressing. At least three robots 3a, 3b, and 3c, positioned next to corresponding press machines 2a, 2b, and 2c, transport the work items provided by material supply device 5 through press system 1. (Robots 3a, 3b, and 3c are to the left of each corresponding press machine 2a, 2b, and 2c facing the page).

Robots 3a, 3b, and 3c are each provided with a corresponding feed bar 11a, on a left side (facing the page) and a feed bar 11b, on a right side (facing the page). Feed bars 11a, 11b are movable to the left, right, up, and down, respective to each corresponding robot 3a, 3b, and 3c. Robots 3a, 3b, and 3c are additionally provided with servo motor 14 (not shown) which acts as a drive source for corresponding feed bars 11a, 11b.

Each feed bar 11a, 11b has a vacuum cup 13 affixed by a finger 12 to each corresponding feed bar 11a, 11b for each robot 3a, 3b, and 3c. Vacuum cups 13 is actuated by an air compression device (not shown).

An intermediate stage 4a, 4b, and 4c is positioned in front of each corresponding robot 3a, 3b, and 3c to temporarily receive work items during the pressing process, as will be explained. Work transport line 7 includes, from upstream side to downstream side, material supply device 5, respective robots 3a, 3b, and 3c, with corresponding intermediate stages 4a, 4b, and 4c, and product removal device 6.

Figure 2:
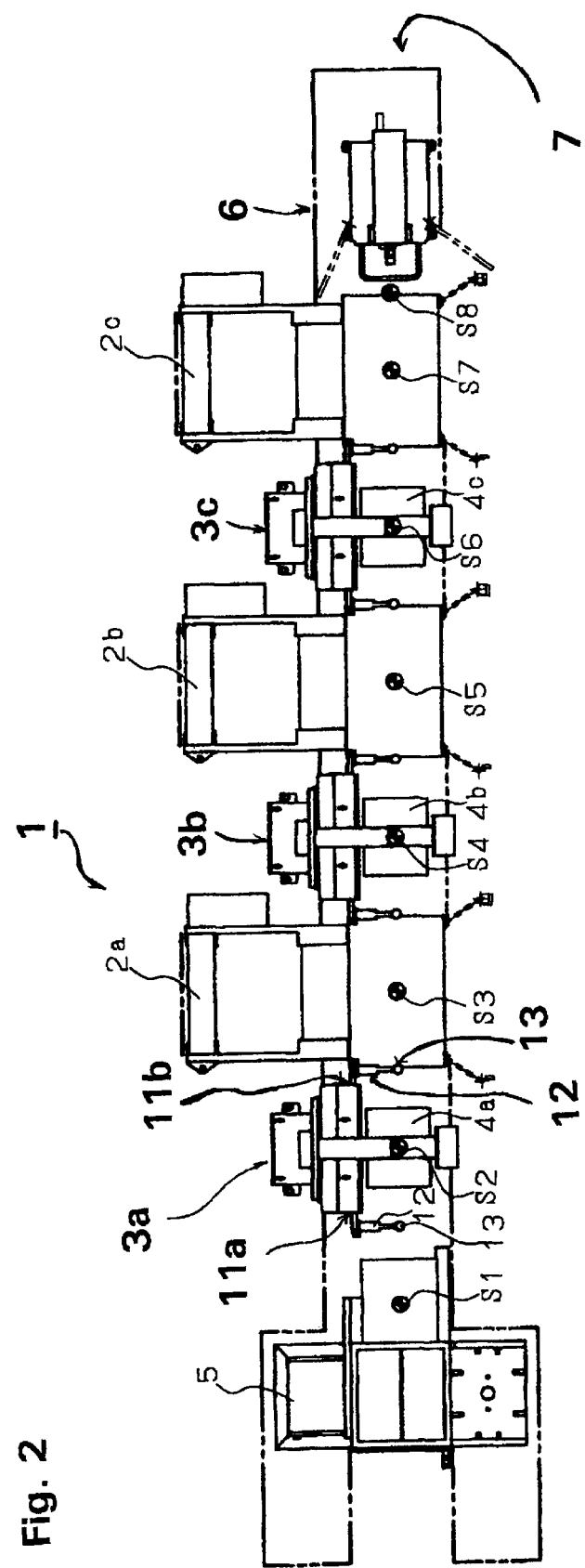
FIG. 2 is a top view of a press system according to an embodiment of the present invention.

Additionally referring now to FIG. 2, where press system 1 is shown from above. Eight stages S1 through S8 are provided in the first embodiment and correspond to each sequential position where the work items (not shown) are positioned during operation.

To begin pressing operations, material supply device 5 places the work item at stage S1. Second, feed bar 11a of robot 3a transports the work item using vacuum cup 13 from stage S1 to stage S2. Third, feed bar 11b of robot 3a transports the work item, using vacuum cup 13, from stage S2 to stage S3 where the work item is pressed by press machine 2a. The work item continues to be transported along work transport line 7 by respective feed bars 11a, 11b of corresponding robots 3b and 3c until reaching stage S8 where product removal device 6 removes the work item.

Figure 3A:
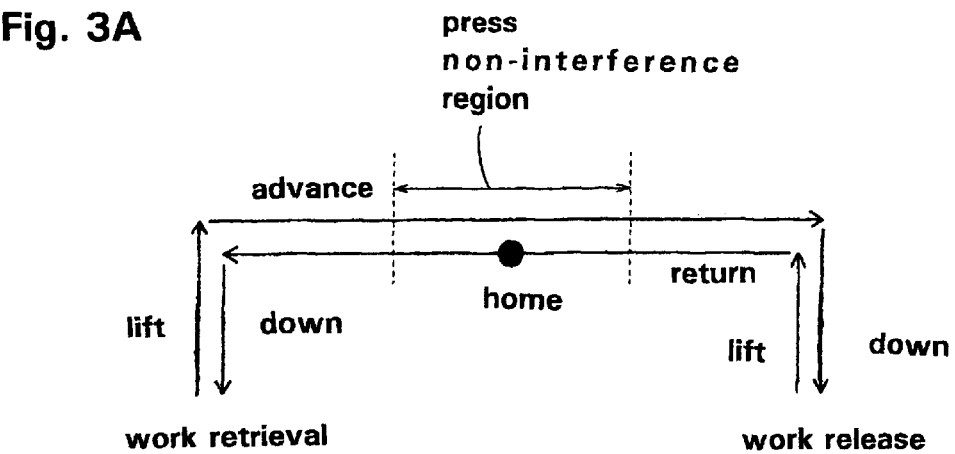
FIG. 3A is a motion diagram of a robot according to an embodiment of the present invention.

Additionally referring now to FIG. 3A, which describes the transport motion of individual feed bars 11a, 11b for respective robots 3a, 3b, and 3c. First, feed bars 11a, 11b move continuously from a home position to a work retrieval position and, using vacuum cup 13, retrieve and hold the work item (not shown). Second, feed bars 11a, 11b move continuously from the work retrieving position and advance to a work releasing position. Third, vacuum cup 13 releases the work item at the next corresponding stage S2–S8. Fourth, feed arms 11a, 11b return to the home position. The home position is within a region of non-interference of feed arms 11a, 11b with corresponding press machines 2a, 2b, and 2c and is generally the return midpoint.

The above described steps first through fourth complete one step in a work transport cycle of press system 1. In other words, after one step in the work transport cycle is completed, feed bars 11a, 11b wait at the home position. As feed arms 11a, 11b travel through the respective work transport cycles of press system 1 they have a motion speed or travel at a work transport speed, as will be explained. During operation, feed bars 11a, 11b of robots 3a, 3b, and 3c operate in an x-axis direction, defined as the advance and return direction, and in a z-axis direction, defined as the lift and lower direction.

Figure 3B:
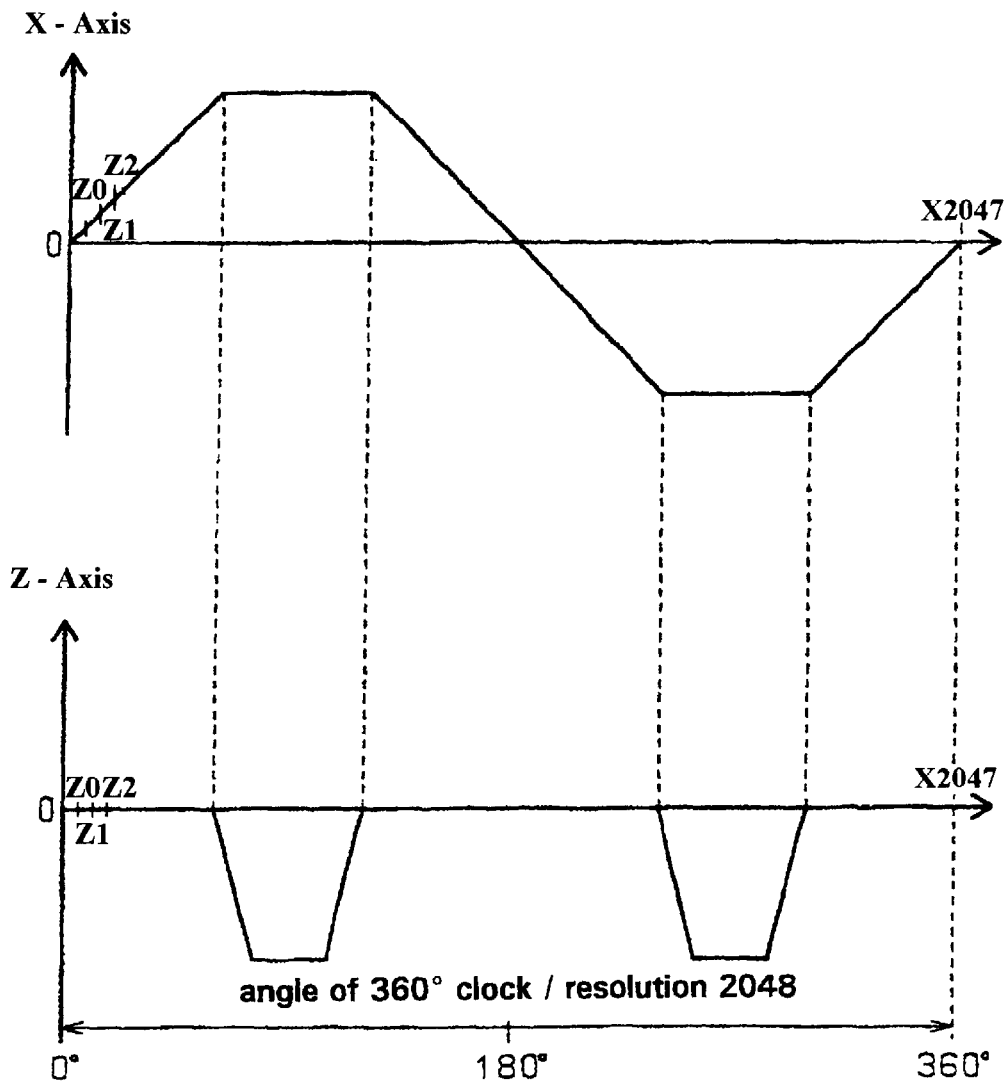
FIG. 3B is a time chart diagram of a robot according to an embodiment of the present invention.

Additionally referring now to FIG. 3B, a time chart represents the position overtime for corresponding feed bars 11a, 11b. The vertical axis are respectively the x-axis and the z-axis of movement. The horizontal axis is the angle of an internal 360 degree clock (not shown) which is equivalent to the work transport speed. The x-axis position and the z-axis position for the above-described home position are both initially set at zero(0) on the horizontal and vertical axis. The x-axis represents the travel distance feed of bars 11a, 11b toward or away (advance or retreat) from the home position. The z-axis represents travel vertically for feed bars 11a, 11b (lift and lower) respective to the home position.

When the internal 360 degree clock angle for one transport cycle is divided into a predetermined resolution of 2048, the corresponding x-axis position and the z-axis position are also divided into divisions of x0, x1, x2, ... x2047 and z0, z1, z2, ... z2048. Each division corresponds to a respective divided internal clock angle. The divided internal 360 degree clock angle and the corresponding x-axis position and z-axis position are referred to as the position data. The set of position data for one step is referred to as the expansion data for that particular individual step, as will be explained.

During operation, a data output means (not shown) acts according to the internal clock(not shown), and outputs the expansion data to each positioning controller 34 according to internal clock(not shown) programed into a ROM 42 (not shown), as will be described. When the positioning data is outputted to positioning controllers 34, each positioning controller 34 outputs an operation command to servo amps 32a, 32b. Based upon the operation command, servo motors 31a, 31b operate. Additionally based upon the outputted position data, programmable controller 45 (not shown) controls various devices 50 (not shown) for corresponding robots 3a, 3b, and 3c, as will be described.

Figure 4:
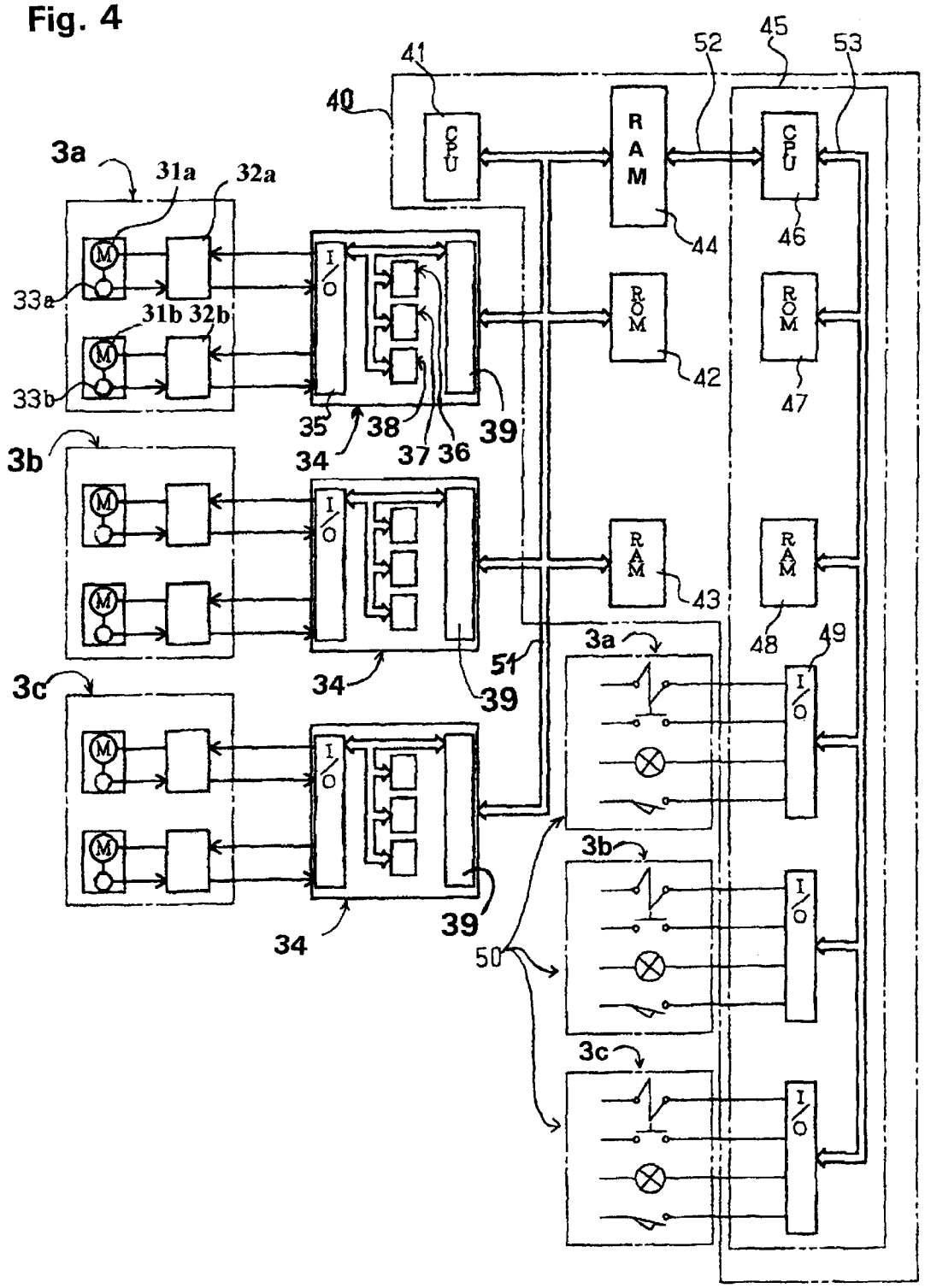
FIG. 4 is a schematic control diagram according to an embodiment of the present invention.

Additionally, referring now to FIG. 4, a schematic control diagram for the control devices of the present embodiment includes robots 3a, 3b, and 3c but intentionally omits control devices for material supply device 5 and product removal device 6. Control devices for both material supply device 5 and product removal device 6 may be later included without interference with the present embodiment.

Each robot 3a, 3b, and 3c is provided with a servo motor 31a and a servo motor 31b, as a means for driving or drive source for each corresponding robot in the above described x-axis(advance-return) and z-axis (lift-lower) directions. Each servo motor 31a is provided with an encoder 33a and a servo amp 32a. Each server motor 31b is provided with an encoder 33b and a servo amp 32b. Encoders 33a, 33b may be of any type such as, mechanical, optical, acoustical, electromagnetic, or others as long as similar results are achieved.

Servo amps 32a, 32b, for each robot 3a, 3b, and 3c, are connected to a corresponding positioning controllers 34. Positioning controllers 34 output an operation command to corresponding servo amps 32a, 32b for each robot 3a, 3b, and 3c. Based upon the operation command, respective servo motors 31a, 31b operate and, corresponding feed bars 11a, 11b of robots 3a, 3b, and 3c operate.

Positioning controllers 34 are each constructed from an input-output (I/O) port 35, a central processing unit (CPU) 36, a read-only memory (ROM) 37, a random-access memory (RAM) 38, and a dual port RAM 39. I/O ports 35 are connected with servo amps 32a, 32b and receive positioning data from servo amps 32a, 32b and communicate positioning data back to servo amps 32a, 32b. In other words, the positioning data is sent back and fourth through I/O ports 35.

A master board 40 includes a CPU 41, a ROM 42, a RAM 43, and a dual port RAM 44. A bus 51 is connected to and communicates to CPU 41, ROM 42, RAM 43, and dual port RAM 44. Bus 51 is connected to dual ports RAM 39 in programmable controllers 34. As a result, through bus 51, dual ports RAM 39, provided in each positioning controller 34, are connected to CPU 41, ROM 42, RAM 43, and dual port RAM 44.

Programmed into ROM 42 is an internal 360 degree clock 61 (not shown) and a data output means (not shown). Internal clock 61(not shown) is equivalent to the movement speed of feed bars 11a, 11b of robots 3a, 3b, and 3c. The movement speed is also the motion speed or work transport speed of feed bars 11a, 11b of robots 3a, 3b, and 3c. During operation, internal clock 61 (not shown) times the movement of respective feed bars 11a, 11b and the data output means (not shown) outputs expansion data to each corresponding positioning controllers 34, according to internal clock 61, as will be explained.

Master board 40 also includes a programmable controller 45. Programmable controller 45 includes a CPU 46, a ROM 47, a RAM 48, and an I/O port 49 for each robot 3a, 3b, and 3c. A bus 53 connects to CPU 46, ROM 47, RAM 48, and I/O ports 49. I/O ports 49 connect to a group of various devices 50 provided on each corresponding robot 3a, 3b, and 3c. Various devices 50 included standard electromagnetic valves, lamps, and other various equipment. A bus 52 connects CPU 46 with dual port RAM 44 of programmable controller 45.

RAM 43 serves as a storage means. During press system 1 operation, expansion data, the pathway of the motion followed by robots 3a, 3b, and 3c during the above-described transport cycle, is plotted and saved in RAM 43. While RAM 43 serves as a primary storage means, other uses are not excludes including prior path histories or prior robot 3a, 3b, or 3c settings or controls.

Figure 5:
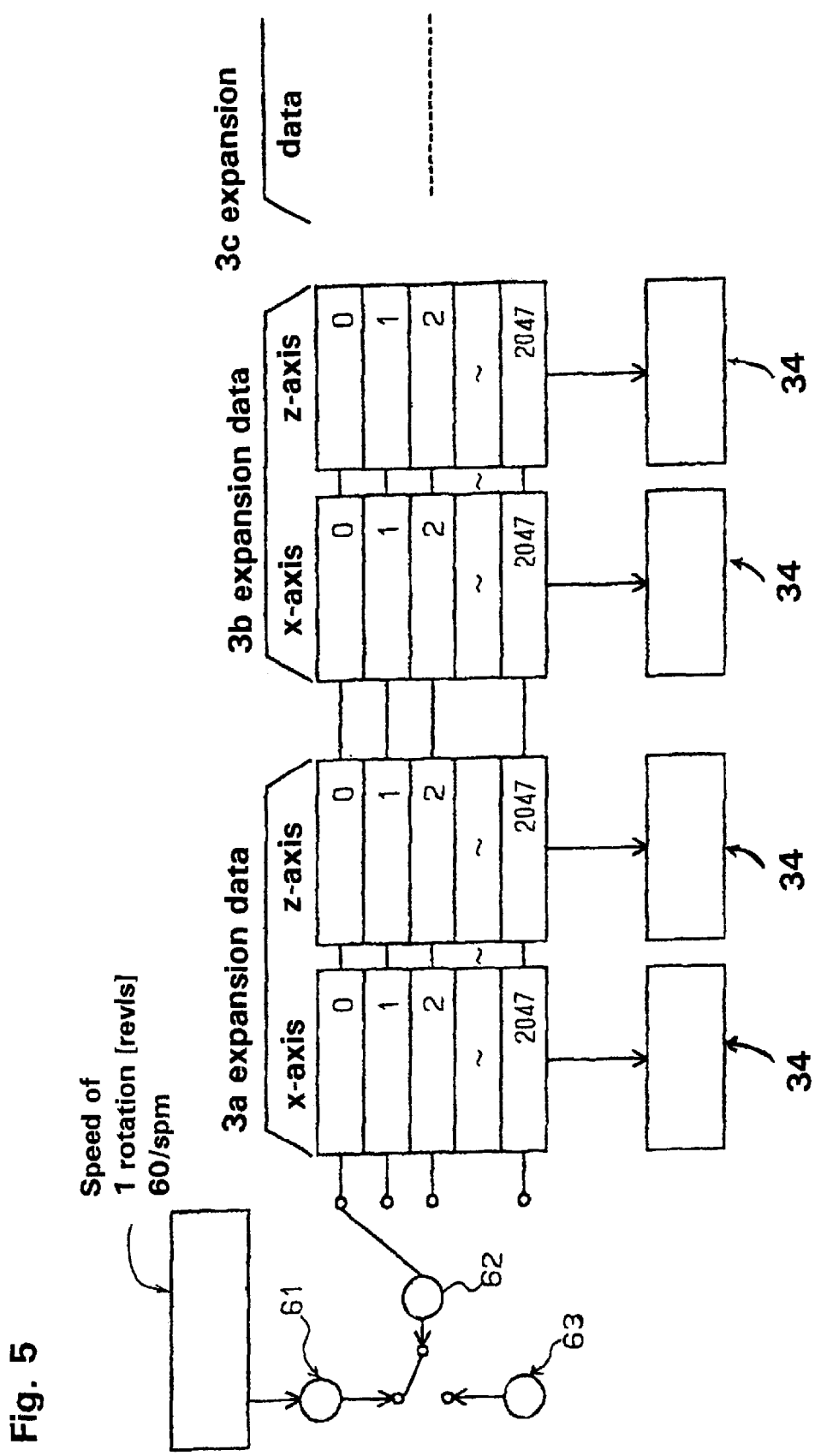
FIG. 5 is a block diagram of an embodiment according to the present invention.

Additionally referring now to FIG. 5, internal clock 61, which has been set to a predetermined speed of 60 spm in the present embodiment, outputs the angle for each position data point. A 2048 encoder 62, detects and encodes this output angle. The data output means outputs both the corresponding position data for each robot 3a, 3b, and 3c, and the angle detected by 2048 encoder 62, to each corresponding positioning controller 34. The position changes represented occur during the respective transport cycles of robots 3a, 3b, and 3c.

In other words, when internal clock 61 reaches an angle which has been divided with a resolution of 2048, the position data is outputted to each positioning controller 34 by the data output means, and servo motors 31a, 31b for robots 3a, 3b, and 3c are operated. As a result, a synchronous inching or movement operation of all robots 3a, 3b, and 3c are possible. Additionally, even if the movement stroke is different for each robot 3a, 3b, and 3c, the operation, inching or otherwise, is synchronized through the control provided.

In this embodiment, it is possible to increase resolution control. Where the resolution is increased, a synchronous operation with an even higher precision may be conducted. The present embodiment is not limited to a resolution of 2048 of encoder 62 as shown. However, the responsiveness of robots 3a, 3b, and 3c, which depends upon the quality of the control devices, may be adversely affected.

A press encoder 63 is used when conducting linked operation with press machine 2a, 2b, or 2c. Linked operation occurs where internal clock 61 is replaced with a signal of encoder 63 that detects a crank angle of press machine 2a, 2b, or 2c. Using press encoder 63, the positioning data is outputted according to a crank angle of the corresponding press machine 2a, 2b, or 2c. Thus, during linked operations, all robots 3a, 3b, and 3 operate synchronously with the press machine 2a, 2b, or 2c, similarly as during synchronous inching operation. As a result, during adjustment work on work transport line 7, robots 3a, 3b, and 3c may be operated simultaneously while avoiding interference with adjacent robots.

There are several advantages of the present embodiment.

First while the flow control diagram for the present embodiment intentionally omits control devices for both material supply device 5 and product removal device 6, these control devices may be later included easily without interference with the present embodiment. This allows rapid adaptation to changing equipment needs.

Second, during inching operations, all robots 3a, 3b, and 3c are operated synchronously with the press machine 2a, 2b, or 2c Third, during linked operations, all robots 3a, 3b, and 3c are operated synchronously with the press machine 2a, 2b, or 2c and there is no need to operate each robot 3a, 3b, or 3c individually.

Fourth, while in the present embodiment there are three press machines 2a, 2b, and 2c, and robots 3a, 3b, and 3c, the synchronous operation is not limited to this number. The number of synchronously operated press machines 2a, 2b, 2c or the number of robots 3a, 3b, 3c may be increased or decreased with minimal concern.

Fifth, even with inching operation conducted during adjustment of work transport or during die exchanges, all robots 3a, 3b, and 3c can be operated synchronously and as a result the adjustment operation become faster and less costly.

Sixth, work including adjustment of work transport or die exchanges can be conducted without worrying about interference from adjacent robots, and work can be conducted safely. Additionally, robots 3a, 3b, or 3c may be continuously operated without need for a waiting time.

Seventh, there is no need to operate a clutch (not shown) (on and off) of press machines 2a, 2b, or 2c during synchronous operation. As a result, operation with a shorter cycle time is possible and cost savings are increased.

Eight, in this embodiment, expansion data, comprising position data with which the pathway of robot movement is plotted, is saved in a storage means. Additionally, in accordance with an internal clock 61, equivalent to the work transport speed, the expansion data is outputted to a positioning controller by a data output means. As a result, a plurality of robots are continuously synchronized unlike the related art that required a matching a position of each robot at a midpoint. As a result, operation of robots is smoother and may be readily adapted to manufacturing requirements.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A synchronous control device, comprising:

an internal clock;

said internal clock defining increments of time;

each said increment of time defining a motion of an outside element;

means for storing data characterizing at least one of a position and a speed history of said outside element;

means for outputting said data to a positioning controller in accordance with said internal clock; and said positioning controller controlling said outside element, whereby a position of said outside element is continuously synchronized with said data.

2. A synchronous control device, comprising:

an encoder signal;

said encoder signal defining increments of time;

each said increment of time defining a motion of an outside element;

means for storing data characterizing at least one of a position and a speed history of said outside element;

means for outputting said data to a positioning controller in accordance with said encoder signal; and said positioning controller controlling said outside element, whereby a position of said outside element is continuously synchronized with said data.

3. A synchronous control device, comprising:

means for storing data characterizing a path of a robot;

a clock;

means for outputting said data to a positioning controller responsive to said clock; and said positioning controller commanding a control source for said robot, whereby said robot is continuously synchronized with said data.

4. A synchronous control device, according to claim 3, wherein:

means for storing data characterizing a path of a robot;

a encoder signal;

means for outputting said data to an positioning controller responsive to said encoder signal; and said positioning controller commanding a control source for said robot, whereby said robot is continuously synchronized with said data.

5. A robot controller for controlling first and second robots serving a common machine tool, said first and second robots being capable of collision with each other or with said machine tool, comprising:

a command generator for generating a first and a second commands;

said first robot being responsive to said first command;

said second robot being responsive to said second command; and said first and second commands being preprogrammed to avoid said collision.

6. Apparatus according to claim 5, further comprising:

a first means for producing a first signal indicating at least one of a position and a speed of said first robot;

a second means for producing a second signal indicating at least one of a position and a speed of said first robot; and said command generator being responsive to said first and second signals to modify at least one of said first and second commands to avoid a collision when said first and second signals indicate that a collision is likely to occur.

7. A synchronous control device for a robot, for control of a work-transporting robot provided between press machines and having a drive source, comprising:

an internal clock being of a type equivalent to a motion speed of said robot;

a positioning controller being of a type which outputs a command signal to a drive source for said robot;

means for storage being of a type which stores position data describing a pathway motion of said robot; and means for output being of a type which outputs said position data to said positioning controller in accordance with said internal clock.

8. A synchronous control device for a robot, for control of a work-transporting robot provided between press machines and having a drive source, comprising:

an encoder signal being of a type equivalent to a motion speed of said robot;

a positioning controller being of a type which outputs a command signal to a drive source for said robot;

means for storage being of a type which stores position data describing a pathway motion of said robot; and means for output being of a type which outputs said position data to said positioning controller in accordance with said encoder signal;

said internal clock is replaced with a signal of an encoder detecting a crank angle of a press machine.

* * * * *